US010310328B2

(12) United States Patent
Nakamori et al.

(10) Patent No.: US 10,310,328 B2
(45) Date of Patent: Jun. 4, 2019

(54) BACKLIGHT DEVICE AND DISPLAY DEVICE EQUIPPED WITH THE SAME

(71) Applicant: Japan Display Inc., Tokyo (JP)

(72) Inventors: Yosuke Nakamori, Tokyo (JP); Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/478,612

(22) Filed: Apr. 4, 2017

(65) Prior Publication Data
US 2017/0285255 A1    Oct. 5, 2017

(30) Foreign Application Priority Data

Apr. 5, 2016    (JP) .................... 2016-076164

(51) Int. Cl.
| | | |
|---|---|---|
| G02F 1/1335 | (2006.01) | |
| F21V 8/00 | (2006.01) | |
| G02F 1/1343 | (2006.01) | |

(52) U.S. Cl.
CPC ....... *G02F 1/133606* (2013.01); *G02B 6/005* (2013.01); *G02B 6/0055* (2013.01);
(Continued)

(58) Field of Classification Search
CPC .... G02B 6/0088; G02B 6/0055; G02B 6/005; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02F 1/134309; G02F 1/133528; G02F 2001/133311; G02F 2001/133314; G02F 2001/133317;
(Continued)

(56) References Cited

U.S. PATENT DOCUMENTS

| | | | | |
|---|---|---|---|---|
| 6,163,350 A | * | 12/2000 | Ihara | ......................... G02B 5/20 |
| | | | | 349/58 |
| 2011/0157519 A1 | * | 6/2011 | Yusa | .................... G02B 6/0053 |
| | | | | 349/64 |

(Continued)

FOREIGN PATENT DOCUMENTS

| | | | |
|---|---|---|---|
| JP | 2011103221 A | * | 5/2011 |
| JP | 2012064420 A | * | 3/2012 |
| JP | 2014-170065 A | | 9/2014 |

OTHER PUBLICATIONS

English translation of JP2011103221A, Title: Lighting System, Electro-Optical Device, and Method of Manufacturing the Lighting System, Author:Ikeda, Takuya; Murase, Tetsuji; Date of publication: May 26, 2011 (Year: 2011).*

(Continued)

*Primary Examiner* — Shan Liu
(74) *Attorney, Agent, or Firm* — Michael Best & Friedrich LLP

(57) ABSTRACT

According to one embodiment, a backlight device includes a case, a light guide in the case, a first optical sheet on the light guide, a second optical sheet on the first optical sheet, a first adhesive provided between the case and at least one of the first optical sheet and the second optical sheet, to stick at least one of the optical sheets to the case, and a light source in the case, configured to radiate light to the light guide.

5 Claims, 11 Drawing Sheets

(52) U.S. Cl.
CPC ..... *G02B 6/0088* (2013.01); *G02F 1/133528* (2013.01); *G02F 1/134309* (2013.01)

(58) Field of Classification Search
CPC .......... G02F 2001/13332; G02F 2001/133322; G02F 2001/133325; G02F 2001/133328; G02F 2001/133331; G02F 2001/133334; G02F 1/1336; G02F 2001/133607; G02F 2001/133616; G02F 1/133308; G02F 1/133608; G02F 1/133606; G02F 1/133504; G02F 1/133615
USPC ................................................ 349/58–64, 65
See application file for complete search history.

(56) References Cited

U.S. PATENT DOCUMENTS

| | | | | |
|---|---|---|---|---|
| 2014/0092339 | A1* | 4/2014 | Yoshimura | G02F 1/133308 349/58 |
| 2014/0168574 | A1* | 6/2014 | Matsubara | G02F 1/133308 349/62 |
| 2014/0268868 | A1* | 9/2014 | Hatta | G02F 1/133606 362/606 |
| 2015/0029443 | A1* | 1/2015 | Inui | G02F 1/133308 349/65 |
| 2015/0277180 | A1* | 10/2015 | Seo | G02F 1/13306 349/58 |
| 2015/0277185 | A1* | 10/2015 | Nam | G02F 1/133512 349/58 |
| 2016/0313485 | A1* | 10/2016 | Oohira | G02F 1/133308 |
| 2016/0341881 | A1* | 11/2016 | Guo | G02B 6/0053 |
| 2018/0274740 | A1* | 9/2018 | Watanabe | F21K 9/20 |

OTHER PUBLICATIONS

English translation of JP2012064420A, Title:Light Source Device and Manufacturing Method of the Same, Author: Suzuki, Hiroyuki; Date of publication: Mar. 29, 2012 (Year: 2012).*

* cited by examiner

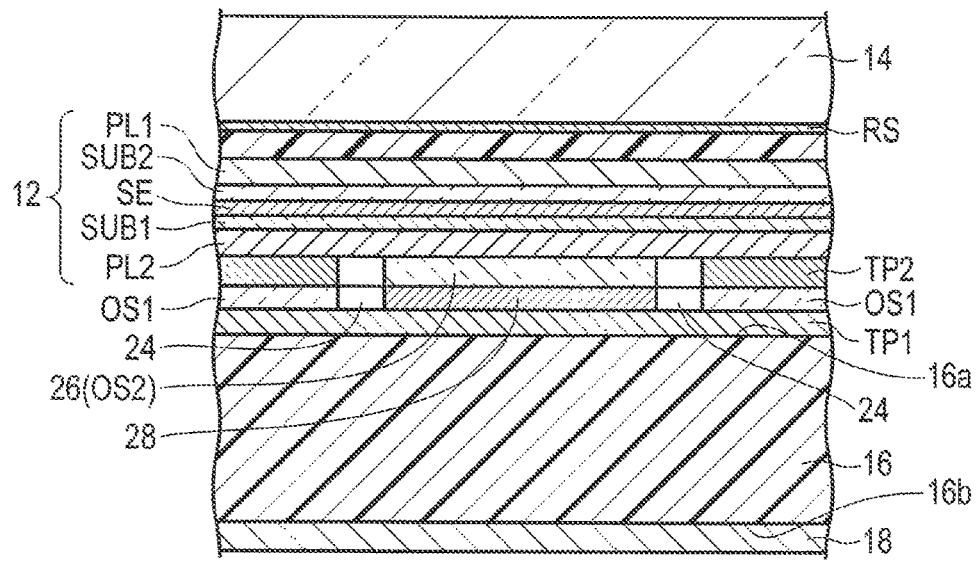
F I G. 8
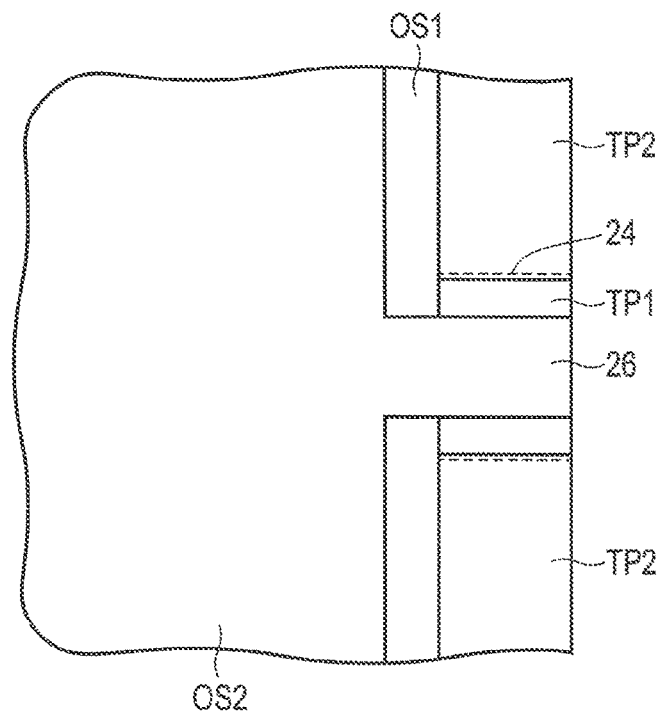
F I G. 9

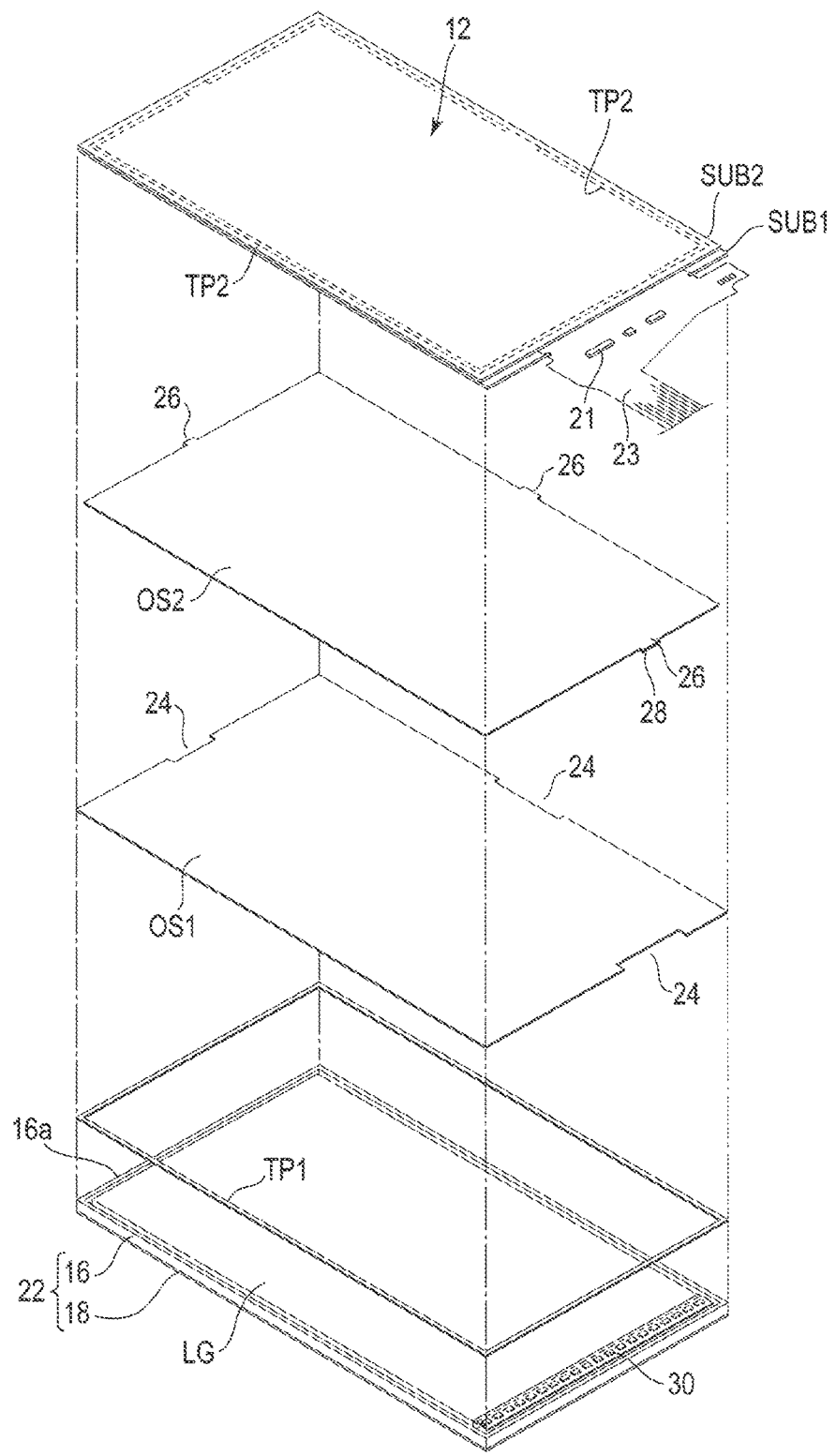
F I G. 13 ns upon and claims the benefit of
BACKLIGHT DEVICE AND DISPLAY DEVICE EQUIPPED WITH THE SAME

CROSS-REFERENCE TO RELATED APPLICATIONS

This application is based upon and claims the benefit of priority from Japanese Patent Application No. 2016-076164, filed Apr. 5, 2016, the entire contents of which are incorporated herein by reference.

FIELD

Embodiments described herein relate generally to a backlight device and a display device equipped with the same.

BACKGROUND

Recently, liquid crystal display devices have been widely employed as display devices for smartphones, personal digital assistants (PDAs), tablet computers, car navigation systems and the like. In general, a liquid crystal display device comprises a liquid crystal display panel and a planar lighting device (backlight device) overlaid on a rear surface of the liquid crystal display panel to illuminate the liquid crystal display panel. A backlight device comprises a reflection layer, a light guide, an optical sheet, a light source such as an LED, and a rectangular mold frame. The reflection layer, the light guide, and the optical sheet are overlaid and stacked on each other, and disposed inside the mold frame.

The optical sheet of the uppermost layer is located and arranged with an upper surface of the mold frame in substantially the same plane, and the upper surface and the optical sheet are stuck on the rear surface of the liquid crystal display panel through a double-faced tape.

In this display device, a thickness of the device includes a thickness of a double-faced tape and further slimming the device is therefore difficult. In addition, a gap is formed between the rear surface of the liquid crystal display panel and the optical sheet in accordance with the thickness of the double-faced tape, the gap may be an obstacle to slimming, and the liquid crystal display panel may be warped in accordance with the gap when load acts on the liquid crystal display panel.

BRIEF DESCRIPTION OF THE DRAWINGS

FIG. 8 is a cross-sectional view showing the liquid crystal display device seen along line C-C of FIG. 1.

FIG. 9 is a plan view showing a stacked layer structure of the optical sheet and the adhesive member of the backlight device.

FIG. 13 is an exploded perspective view showing the liquid crystal display device according to a fourth modified example.

DETAILED DESCRIPTION

Figure 1:
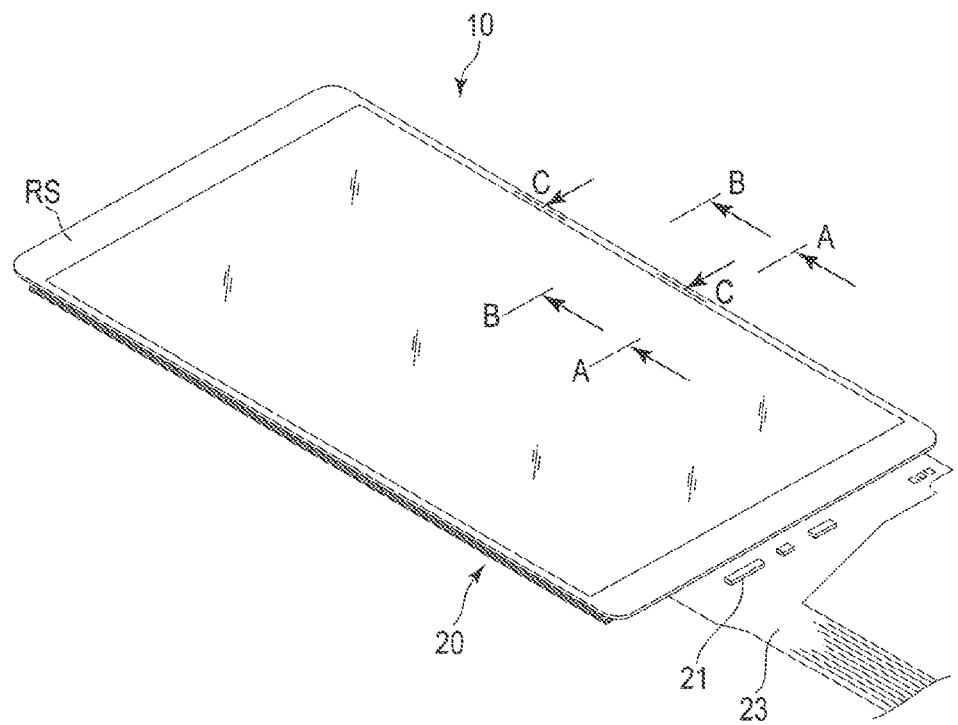
FIG. 1 is a perspective view showing a display surface side of a liquid crystal display device according to a first embodiment.

Various embodiments will be described hereinafter with reference to the accompanying drawings. In general, according to one embodiment, a backlight device comprises a case; a light guide in the case; a first optical sheet on the light guide; a second optical sheet on the first optical sheet; a first adhesive provided between the case and at least one of the first optical sheet and the second optical sheet, to stick at least one of the optical sheets to the case; and a light source in the case, configured to radiate light to the light guide.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
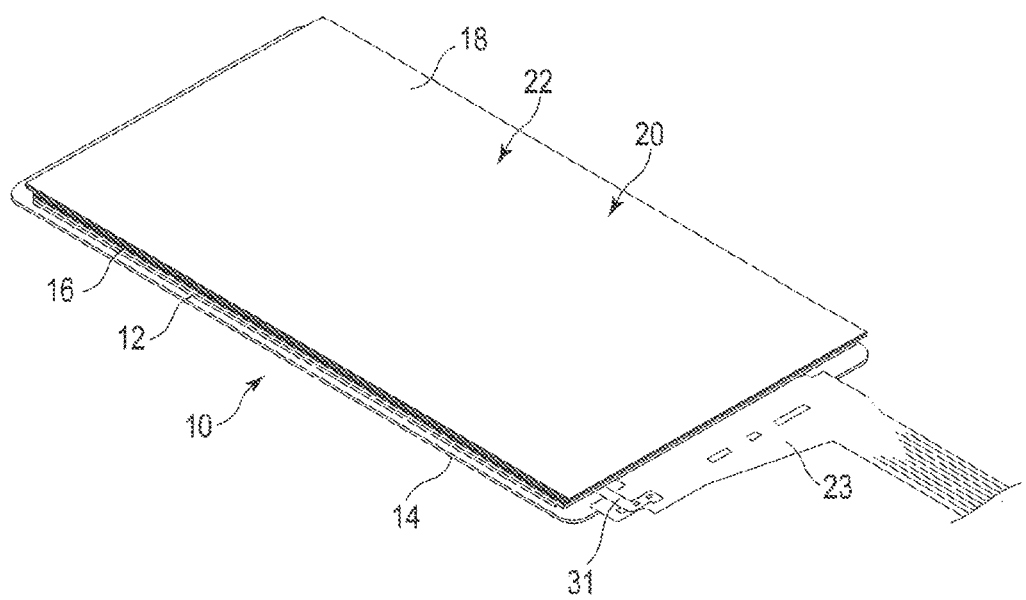
FIG. 2 is a perspective view showing a rear surface side of the liquid crystal display device.
Figure 3:
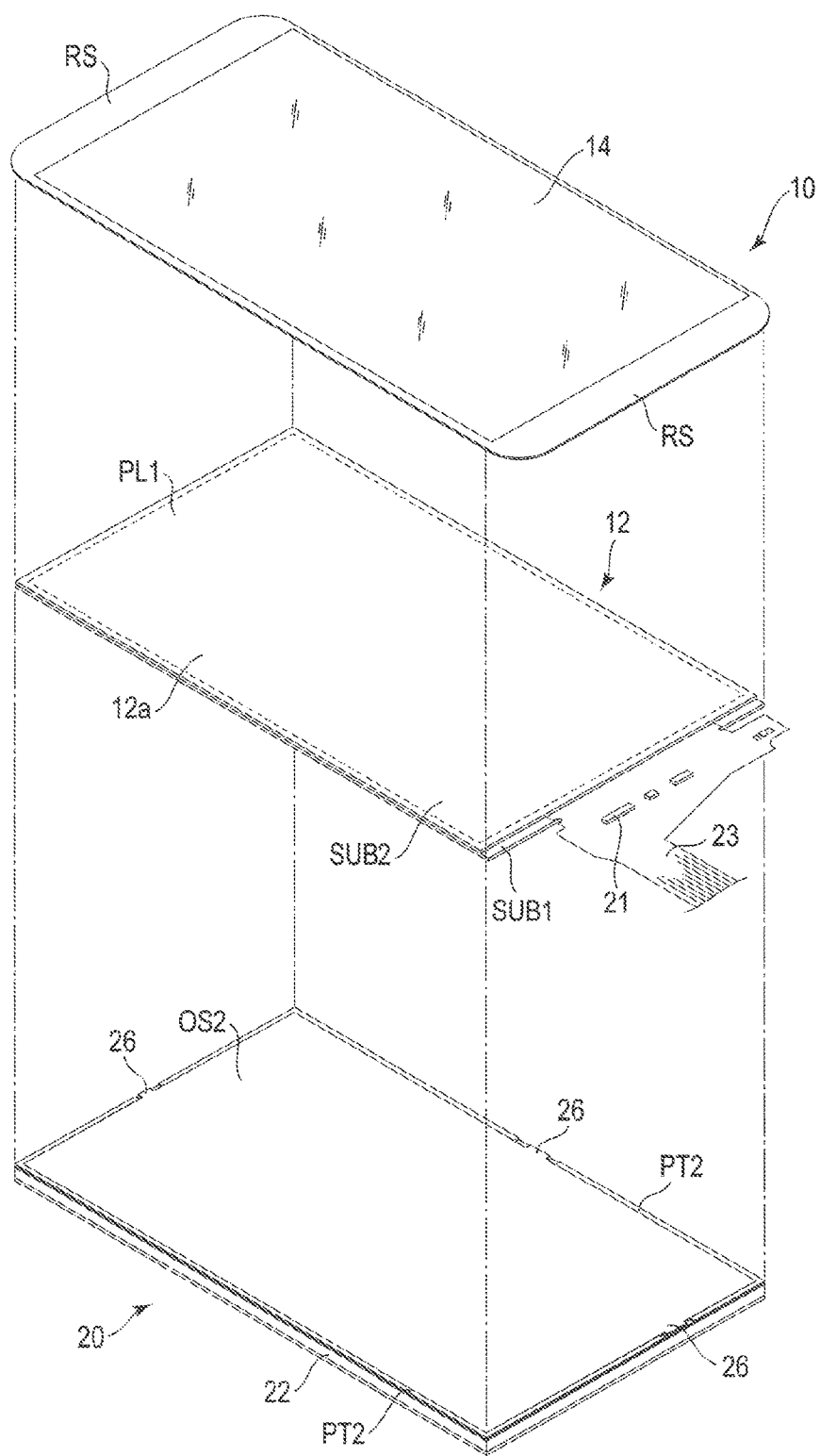
FIG. 3 is an exploded perspective view showing the liquid crystal display device.

FIG. 1 and FIG. 2 are perspective views showing a display surface side and a rear surface side of a liquid crystal display device according to a first embodiment, respectively, and FIG. 3 is an exploded perspective view showing the liquid crystal display device.

A liquid crystal display device (hereinafter, display device) 10 can be used after built in, for example, various electronic devices such as smartphones, tablet terminals, cell phones, notebook computers, portable game consoles, electronic dictionaries, TV receivers, and car navigation systems.

As shown in FIG. 1 to FIG. 3, the display device 10 comprises an active-matrix flat liquid crystal display panel (hereinafter, display panel) 12, a transparent cover panel 14 overlaid on a display surface 12a which is one of flat surfaces of the display panel 12 to cover the entire display surface 12a, and a backlight unit (backlight device) 20 oppositely disposed on the rear surface side which is the other flat surface of the display panel 12.

Figure 4:
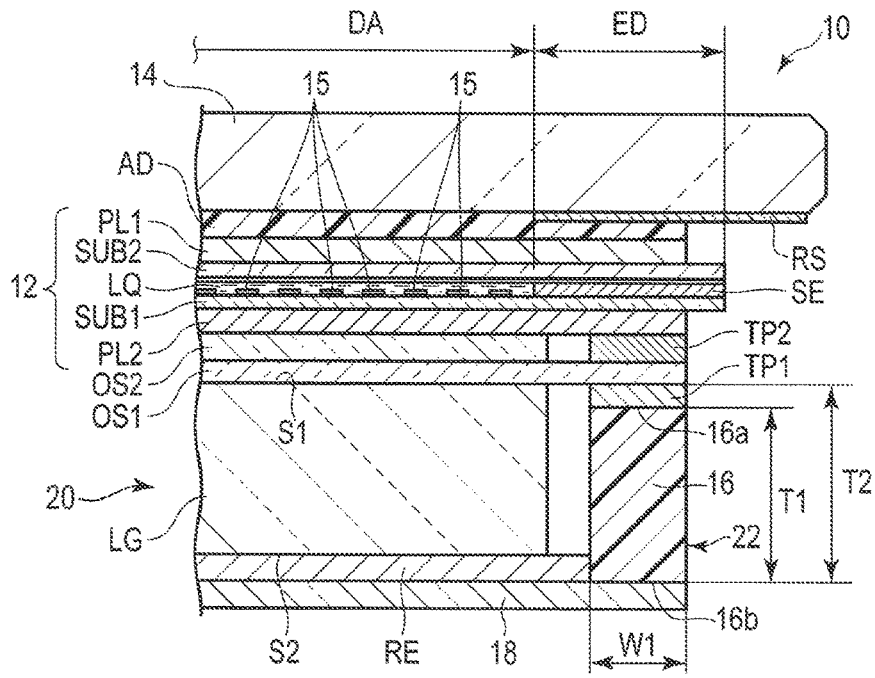
FIG. 4 is a cross-sectional view showing the liquid crystal display device seen along line A-A of FIG. 1.
Figure 5:
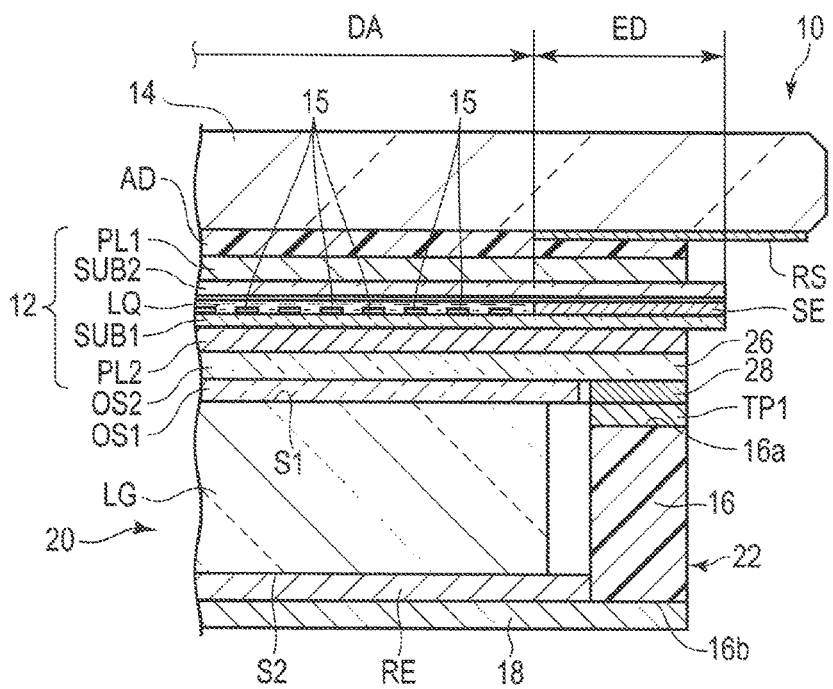
FIG. 5 is a cross-sectional view showing the liquid crystal display device seen along line B-B of FIG. 1.

FIG. 4 is a cross-sectional view showing the display device seen along line A-A of FIG. 1 while FIG. 5 is a cross-sectional view showing the display device seen along line B-B of FIG. 1. As shown in FIG. 3 to FIG. 5, the display panel 12 comprises a first substrate SUB1 shaped in a rectangular flat plate, a second substrate SUB2 shaped in a rectangular flat plate and opposed to the first substrate SUB1, and a liquid crystal layer LQ held between the first substrate SUB1 and the second substrate SUB2. A peripheral portion of the second substrate SUB2 is stuck on the first substrate SUB1 by a sealing member SE. A polarizer PL1 is stuck on a surface of the second substrate SUB2 to form a display surface 12a of the display panel 12. A polarizer PL2 is stuck on a surface of the first substrate SUB1 (i.e., the rear surface of the display panel 12). In addition, electrodes 15 such as a pixel electrode and a common electrode and conductive lines (not shown) are formed on an inner surface of at least one of the substrates, for example, the first substrate SUB1.

On the display panel 12, a rectangular display area (active area) DA is provided in a region which is the inner side of the sealing member SE, and an image is displayed in the display area DA, in a planar view of the display panel (indicating a state of viewing the display panel from a normal direction of the surface of the display panel, as mentioned below). In addition, a rectangular frame area (non-display area) ED is provided around the display area DA. The display panel 12 is a transmissive display panel having a transmissive display function of displaying an image by selectively urging the light from the backlight unit 20 to be transmitted through the display area DA. The display panel 12 may be configured to correspond to a lateral electric field mode primarily using a lateral electric field approximately parallel to principal surfaces of the substrates or a longitudinal electric field mode primarily using a longitudinal electric field approximately perpendicular to the principal surfaces of the substrates, as a display mode.

In the example illustrated, a flexible printed circuit (FPC) 23 is bonded to a short side end portion of the first substrate SUB1 and extends outwardly from the display panel 12. A semiconductor element such as a driver IC chip 21 is mounted on the FPC 23 as a signal supply source which supplies a signal necessary to drive the display panel 12.

As shown in FIG. 1 to FIG. 5, the cover panel 14 is formed of, for example, a glass plate, transparent acrylic resin or the like and shaped in a rectangular flat plate. The cover panel 14 has a width and a length larger than dimensions (width and length) of the display panel 12 and has area larger than the display panel 12 in planar view. A frame-shaped light-shielding layer RS is formed on a periphery of the rear surface of the cover panel 14 (i.e., the surface of the display panel 12 side). On the cover panel 14, regions other than a region opposed to the display area DA of the display panel 12 are shielded from the light by the light-shielding layer RS. The light-shielding layer RS may be formed on an upper surface (display surface) of the cover panel 14.

The rear surface (back surface) of the cover panel 14 is stuck on the polarizer PL1 by an adhesive or tackiness agent which has a light transmitting property or which is transparent, for example, an adhesive sheet AD formed of optically transparent resin, and entirely covers the display surface 12a. The adhesive sheet AD is formed in the same size as the size of the polarizer PL1 and adhered on the polarizer PL1 with being aligned thereto.

When the state of sticking the cover panel 14 on the display panel 12 is observed in planar view, the peripheral portion of the cover panel 14 protrudes outwardly from the outer periphery of the display panel 12. Long sides of the cover panel 14 and long sides of the display panel 12 are approximately parallel to each other and spaced apart at a regular interval. Short sides of the cover panel 14 and short sides of the display panel 12 are approximately parallel to each other and spaced apart at a predetermined interval. In the present embodiment, the interval between the long sides of the cover panel 14 and the long sides of the display panel 12, i.e., the width of the long-side peripheral portion of the cover panel 14 is formed to be smaller than the interval between the short sides of the cover panel 14 and the short sides of the display panel 12, i.e., the width of the short-side peripheral portion of the cover panel.

Figure 6:
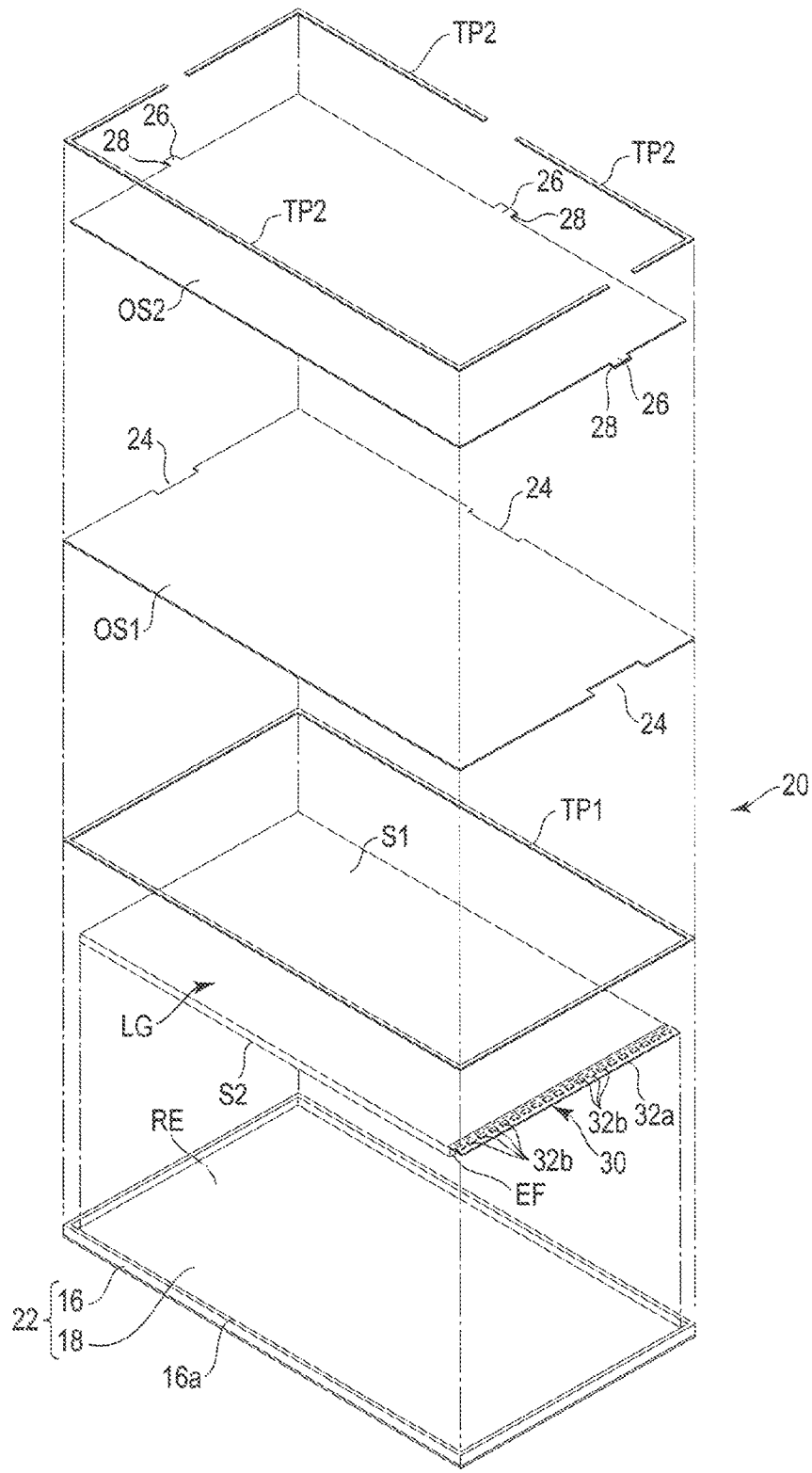
FIG. 6 is an exploded perspective view showing a backlight device.

FIG. 6 is an exploded perspective view showing the backlight unit 20. As shown in FIG. 3, FIG. 4 and FIG. 6, the backlight unit 20 comprises a case 22 formed in a flat and rectangular shape, a support frame 16 shaped in a rectangular frame which is stuck on the rear surface of the display panel 12, a reflective sheet RE disposed on a bottom surface of the case 22, optical members disposed inside the case 22, and a light source unit 30 which supplies light incident on the optical members.

The case 22 includes a support frame 16, which has a first surface (upper surface) 16a and a second surface (lower surface) 16b on a side opposite to the first surface 16a, and a bottom plate 18 stuck on the second surface 16b to constitute a bottom of the case 22. The support frame 16 is, for example, a frame formed of synthetic resin by molding, having, for example, a width W1 of 0.5 mm and a height T1 of approximately 0.45 mm. In addition, outer dimensions of the support frame 16 are approximately equal to outer dimensions of the polarizer PL2 of the display panel 12. The bottom plate 18 is formed of, for example, a stainless plate (SUS plate) having a thickness of 0.3 mm.

The reflective sheet RE is formed to have outer dimensions approximately equal to the outer dimensions of the support frame 16, and covers an approximately entire surface of the bottom plate 18. A reflective sheet having a thickness of 200 μm or less, desirably, 50 to 90 μm and a reflectance of 90% or more, desirably, 95% or more is used as the reflective sheet RE.

The backlight unit 20 comprises a light guide LG in a rectangular shape in planar view and a plurality of, for example, two optical sheets, i.e., a first optical sheet OS1 and a second optical sheet OS2 overlaid on the light guide LG. The number of optical sheets is not limited to two but three or more optical sheets may be used.

The light guide LG has a first surface S1 which is a light output surface, a second surface S2 on a side opposite to the first surface S1, and an incidence surface EF connecting the first surface S1 and the second surface S2. In the present embodiment, one of short-side surfaces of the light guide LG is regarded as the incidence surface EF. The light guide LG is formed to have outside dimensions (length and width) which are slightly smaller than inner dimensions of the frame 16 and slightly larger than the display area DA of the display panel 12. A light guide having a thickness of, for example, approximately 0.23 to 0.32 mm is used as the light guide LG.

The light guide LG is disposed in the support frame 16 and placed on the reflective sheet RE, in a state in which the second surface S2 side is opposed to the reflective sheet RE. In this state, a height T2 from the bottom plate 18 of the case 22 to the first surface S1 of the light guide LG is larger than the height T1 of the support frame 16. In other words, the support frame 16 is formed such that the first surface 16a is located at the height T1, i.e., a position lower than the first surface (upper surface) S1 of the light guide LG. A difference between the height T2 and the height T1 (T2−T1) is set to be equal to a thickness of an adhesive (double-faced tape) to be explained later.

The incidence surface EF of the light guide LG is opposed to the short side portion of the support frame 16 and spaced apart from the short side portion at a small gap. As shown in FIG. 6, the light source unit 30 comprises, for example, a circuit board 32a shaped in an elongated strip shape and light sources (for example, LEDs) 32b mounted and arranged on the circuit board 32a. The light source unit 30 is disposed in the support frame 16 such that the light sources 32b are opposed to the incidence surface EF of the light guide LG.

As shown in FIG. 3, FIG. 4 and FIG. 6, the diffusion sheet and the prism sheet formed of synthetic resin such as polyethylene terephthalate and having the light transmitting property are used as the first optical sheet OS1 and the second optical sheet OS2, in the present embodiment. The first optical sheet OS1 is formed in a rectangular shape having the outer dimensions approximately equal to the outer dimensions of the support frame 16. The first optical sheet OS1 includes concaves (cutaway portions) 24 formed on a plurality of sides, for example, two opposed short sides and one long side. Each of the concaves 24 is formed to have an approximately equal width (depth) to the width of the support frame 16.

The first optical sheet OS1 is placed on the first surface S1 of the light guide LG, and its peripheral end portion is stuck on the first surface 16a of the support frame 16 by a first adhesive (casing-side adhesive) TP1 of a double-faced tape or the like.

The first adhesive TP1 is formed in the rectangular frame shape having the same dimensions as the support frame 16. In other words, the first adhesive TP1 is formed to have the same outer dimensions as the support frame 16 and the same width as the width W1 of the support frame 16.

In the present embodiment, the wording such as "the same" or "equal" dimensions does not positively exclude an error which cannot be avoided in manufacturing an actual product or expecting the error as a tolerance in the design, but implies the dimensions which are considered approximately equal from this viewpoint. The wording is also considered in the following descriptions.

As shown in FIG. 4, the first adhesive TP1 is formed to have the thickness equal to the difference (T2−T1) between the height T1 of the support frame 16 and the height T2 of the first surface S1 of the light guide LG. An adhesive having a thickness of, for example, 0.05 to 0.1 mm can be used as the first adhesive TP1. The upper surface (i.e., the adhesive surface on the first optical sheet side) of the first adhesive TP1 is located in the same plane as the first surface S1 of the light guide LG by overlaying and sticking the first adhesive TP1 on the first surface 16a of the support frame 16. The peripheral portion of the first optical sheet OS1 placed on the first surface S1 of the light guide LG and stuck on the upper surface of the first adhesive TP1, and the first optical sheet OS1 is thereby stuck on the support frame 16 through the first adhesive TP1.

In addition, the concaves 24 are formed at a plurality of parts (three parts in the present embodiment) in the periphery of the first optical sheet OS1. Each of the concaves 24 of the first optical sheet OS1 is overlaid on the first adhesive TP1.

As shown in FIG. 3, FIG. 4 and FIG. 6, the second optical sheet OS2 is formed in a rectangular shape having the outer dimensions slightly smaller than the inner dimensions of the support frame 16. The second optical sheet OS2 integrally includes three tabs 26 protruding from a plurality of sides, for example, two opposed short sides and one long side. The tabs 26 are provided at positions corresponding to three concaves 24 of the first optical sheet OS1. Each of the tabs 26 is formed in, for example, a rectangular shape and has a protrusion height corresponding to the outer edge of the support frame 16 and a width shorter than the length of the concave 24. A spacer 28 having the same shape as the tab 26 is stuck on the back surface of the tab 26, i.e., the surface on the support frame 16 side. For example, a single-faced tape or a double-faced tape is used as the spacer 28. The spacer 28 is formed to have a thickness equal to the thickness of the first optical sheet OS1. The spacers 28 can also be configured to be provided at positions corresponding to the tabs 26, on the first adhesive TP1.

The second optical sheet OS2 is placed on the first optical sheet OS1 and each of the tabs 26 of the second optical sheet OS2 is stuck on the first adhesive TP1 through the concave 24 of the first optical sheet OS1 and via the spacer 28.

Figure 7:
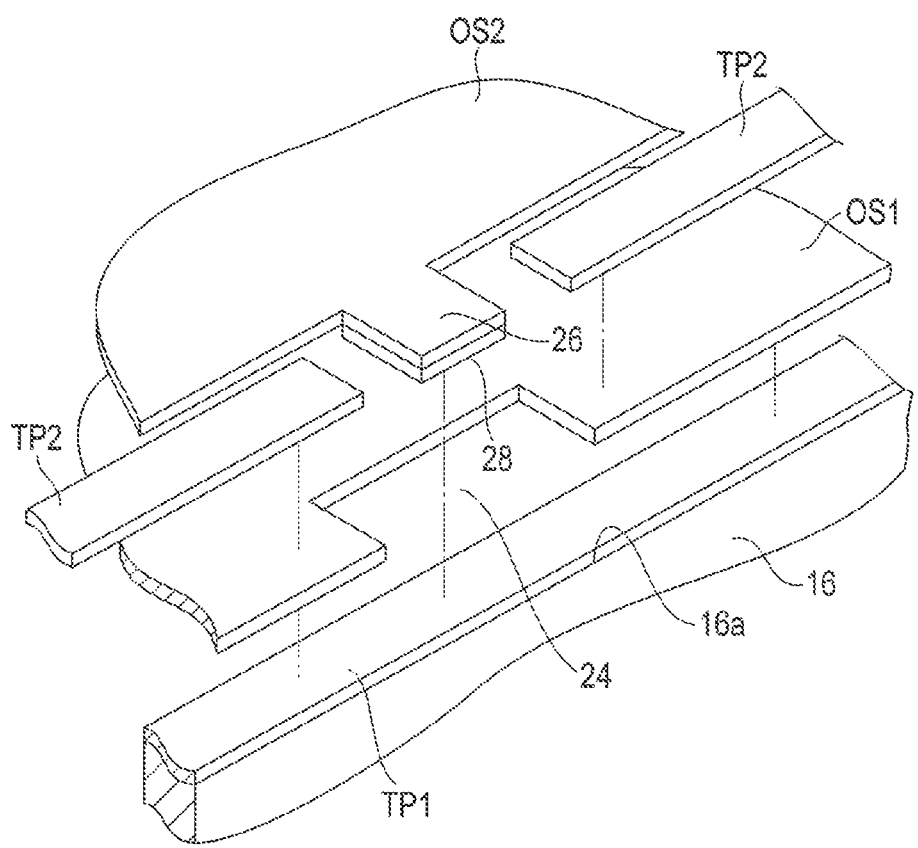
FIG. 7 is an exploded perspective view showing an optical sheet and an adhesive member of the backlight device.

FIG. 7 is an exploded perspective view showing a positional relationship among the tab portion of the second optical sheet, the first optical sheet, the first adhesive TP1 and second adhesives TP2, FIG. 8 is a cross-sectional view showing the display device including the tab portion as seen along line C-C of FIG. 1, and FIG. 9 is a plan view schematically showing a stacked state of the first optical sheet, the second optical sheet, the first adhesive and the second adhesive.

As shown in FIG. 5 and FIG. 7 to FIG. 9, each of the tabs 26 of the second optical sheet OS2 is opposed to the concave 24 of the first optical sheet OS1, and the spacer 28 is located in the concave 24 and stuck on the upper surface of the first adhesive TP1. Thus, the second optical sheet OS2 is fixed on the support frame 16 by sticking three tabs 26 on the first adhesive TP1. A protrusion end of each tab 26 is located in the same plane as the outside surface of the support frame 16.

As shown in FIG. 3 and FIG. 6, the backlight unit 20 comprises the second adhesives (panel-side adhesives) TP2 such as the double-faced tapes, in the present embodiment. The second adhesives TP2 are formed to have the same width. The second adhesives have substantially the same thickness as the thickness of the second optical sheet OS2, a thickness of the second adhesives TP2 is 0.05 mm to 0.1 mm, for example. In addition, the second adhesives TP2 are opposed to the peripheral portions of the second optical sheet OS2 and opposed to the first surface 16a of the support frame 16 in planar view. Furthermore, the second adhesives TP2 are provided with the gaps formed at a plurality of portions, i.e., three portions corresponding to three tabs 26 of the second optical sheet OS2. The second adhesives TP2 are arranged with gaps larger than the width of the tabs 26 at the portions corresponding to the respective tabs 26.

As shown in FIG. 3 to FIG. 9, the second adhesives TP2 are stuck on the peripheral portions of the first optical sheet OS1 and disposed along the outer edges of the first optical sheet OS1. At this time, the second adhesives TP2 are stuck on the first optical sheet OS1 such that three tabs 26 are located at the respective gaps of the divided portions of the second adhesives TP2, i.e., so as to avoid to lap the tabs 26. Thus, the second adhesives TP2 are located around the second optical sheet OS2 without being overlaid on the tabs 26, and the upper surfaces of the second adhesives TP2 are arranged with the upper surfaces of the second optical sheet OS2 in the same plane, i.e., arranged to be flush with the upper surfaces of the second optical sheet OS2.

According to the backlight unit 20 having the above configuration, as shown in FIG. 4 and FIG. 8, the first adhesive TP1, the first optical sheet OS1, and the second adhesives TP2 are overlaid in the height direction, on the first surface 16a of the support frame 16. The peripheral portion of the first optical sheet OS1 is fixed on the support frame 16 by the first adhesive TP1 provided between the first surface 16a and the first optical sheet OS1.

As shown in FIG. 5 and FIG. 8, the first adhesive TP1, the spacer 28, and the tab 26 of the second optical sheet OS2 are overlaid on the first surface 16a in the height direction, at the portion of the tab 26 of the second optical sheet OS2. The tab 26 is fixed on the support frame 16 by the spacer 28 and the first adhesive TP1 provided between the first surface 16a and the tab 26.

The backlight unit 20 configured as explained above is disposed oppositely to the rear surface of the display panel 12 and attached to the polarizer PL2 by the second adhesive TP2, as shown in FIG. 2 to FIG. 5. In other words, the support frame 16 is stuck on the rear-surface peripheral portion of the polarizer PL2 by the second adhesive TP2, and the outer periphery of the support frame 16 and the outer periphery of the second adhesive TP2 are arranged in a state of being aligned with the periphery of the polarizer PL2. Since the upper surface of the second adhesive TP2 and the upper surface of the second optical sheet OS2 are located in the same plane, the second optical sheet OS2 abuts on the polarizer PL2 by sticking the second adhesive TP2 on the polarizer PL2. In particular, if the second optical sheet OS2 is a prism sheet, at least a tip of each of prisms abuts on the polarizer PL2. In addition, the polarizer PL2 is designed to comprise a reflecting and polarizing layer and a transparent member stuck on the reflecting and polarizing layer, and can also employ a structure in which the tip of the prism sheet is in contact with the transparent member.

The support frame 16 is disposed at a position opposed to a frame area ED of the display panel 12, and the first optical sheet OS1, the second optical sheet OS2 and the light guide LG are opposed to the display area DA of the display panel 12. A printed circuit board 32 of the light source unit 30 is connected to the FPC 23 via a connection end portion 31 (see FIG. 6). A drive current is thereby made to flow to an LED 34 via the FPC 23 and the printed circuit board 32. Light emitted from the LED 34 enter the light guide LG from the incidence surface EF, propagates inside the light guide LG, or is emitted from the second surface S2, reflected by the reflective sheet RE and made incident again in the light guide LG. After having passed through the optical path, the light from the LED 34 is emitted from the entire region of the first surface (light emission surface) S1 to the display panel 12 side. The emitted light is diffused by the first optical sheet OS1 and the second optical sheet OS2 and then enter the display area DA.

According to the display device 10 and the backlight unit 20 of the present embodiment configured as described above, the adhesive (double-faced tape) of the backlight unit 20 is divided into the first adhesive TP1 for bonding the optical sheet and the second adhesive TP2 for bonding the display panel, and the first and second adhesives are stacked and bonded on the first surface of the support frame 16 in the height direction together with the optical sheet. The thickness of the first and second adhesives can be thereby included in the thickness of the light guide LG and the optical sheets OS1 and OS2. As the result, the backlight unit 20 and the display device 10 can be slimmed. Simultaneously, the gap between the second optical sheet OS2 of the backlight unit 20 and the display panel 12 can be removed and the entire body of the display device 10 can be further slimmed. Furthermore, by removing the gap, the display panel 10 and the backlight 20 unit can be substantially integral with each other to stand against a bending stress. Accordingly, warp of the display panel 10 can be suppressed and the display quality can be improved when the load is applied to the display panel 10.

In the above-described first embodiment, the number of the tabs 26 is not limited to three but at least one or two tabs may be provided. Alternatively, at least four tabs 26 can also be provided. In addition, the shape and the size of the tabs can be variously selected. The number of the optical sheets is not limited to two, but at least three optical sheets can also be provided. For example, if a third optical sheet is provided, this optical sheet is formed in substantially the same dimensions as the dimensions of the second optical sheet, and a plurality of tabs protruding from a plurality of sides are provided on the optical sheet. These tabs are provided at positions displaced from the tabs of the second optical sheet. The third optical sheet is placed on the second optical sheet and each of the tabs of the third optical sheet is stuck on the second adhesive. The third adhesive similar to the second adhesive TP2 may be overlaid and stuck on the second adhesive TP2 and arranged to be flush with the third optical sheet around the third optical sheet.

Next, the display devices of various modified examples and the display device of another embodiment will be described. In the modified examples and another embodiment to be described below, portions equivalent to those of the first embodiment are denoted by the same reference numerals and detailed explanation is omitted or simplified, such explanation being mainly given to portions different from those of the first embodiment.

First Modified Example

Figure 10:
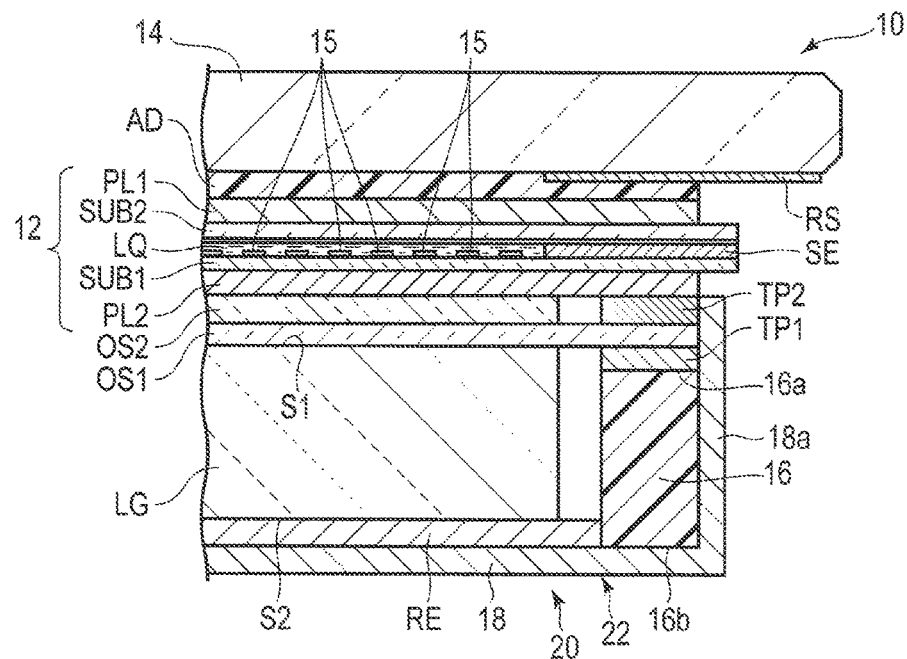
FIG. 10 is a cross-sectional view showing the liquid crystal display device according to a first modified example.

FIG. 10 is a laterally cross-sectional view showing the display device of a first modified example.

In the above-described first embodiment, the outside surfaces of the first optical sheet OS1 and the surfaces of the tabs of the second optical sheet OS2 are exposed from the outside surfaces of the support frame 16. For this reason, a small quantity of the light may leak from the outside surfaces of the first optical sheet OS1 and the outside surfaces of the tabs 26. For this reason, a side plate 18a is formed by bending a part of the bottom plate 18 of the case 22, and the outside surface of the support frame 16, the surfaces of the first adhesive TP1 and the second adhesive TP2, the outside surface of the first optical sheet OS1, and the surface of the tab 26 of the second optical sheet OS2 are covered with the side plate 18a, in the first modified example, as shown in FIG. 10.

In this structure, light leakage from the first optical sheet OS1 and the second optical sheet OS2 can be prevented.

Second Modified Example

Figure 11:
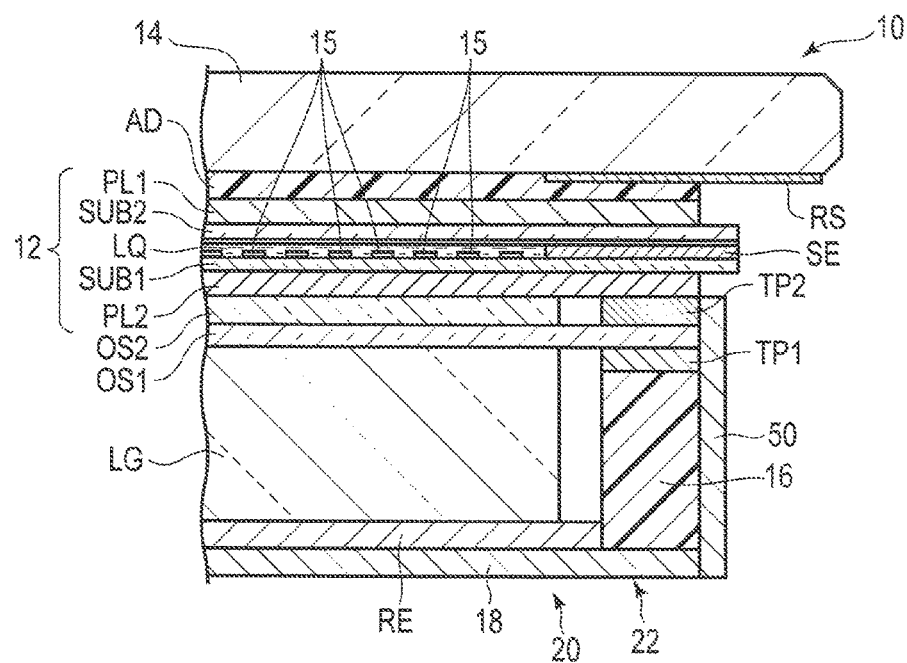
FIG. 11 is a cross-sectional view showing the liquid crystal display device according to a second modified example.

FIG. 11 is a laterally cross-sectional view showing the display device of a second modified example.

As shown in the figure, a light-shielding member 50 such as a light-shielding resin, a light-shielding film, a light-shielding tape or the like may be provided on the outside surface of the support frame 16 instead of the side plate, and the outside surface of the support frame 16, the surfaces of the first adhesive TP1 and the second adhesive TP2, the outside surface of the first optical sheet OS1, and the surface of the tab 26 of the second optical sheet OS2 may be covered with the light-shielding member 50. In this case, the light leakage prevention effect can be obtained if at least the outside surface of the first optical sheet OS1 and the surface of the tab 26 of the second optical sheet OS2 are covered with the light-shielding member 50.

Third Modified Example

Figure 12:
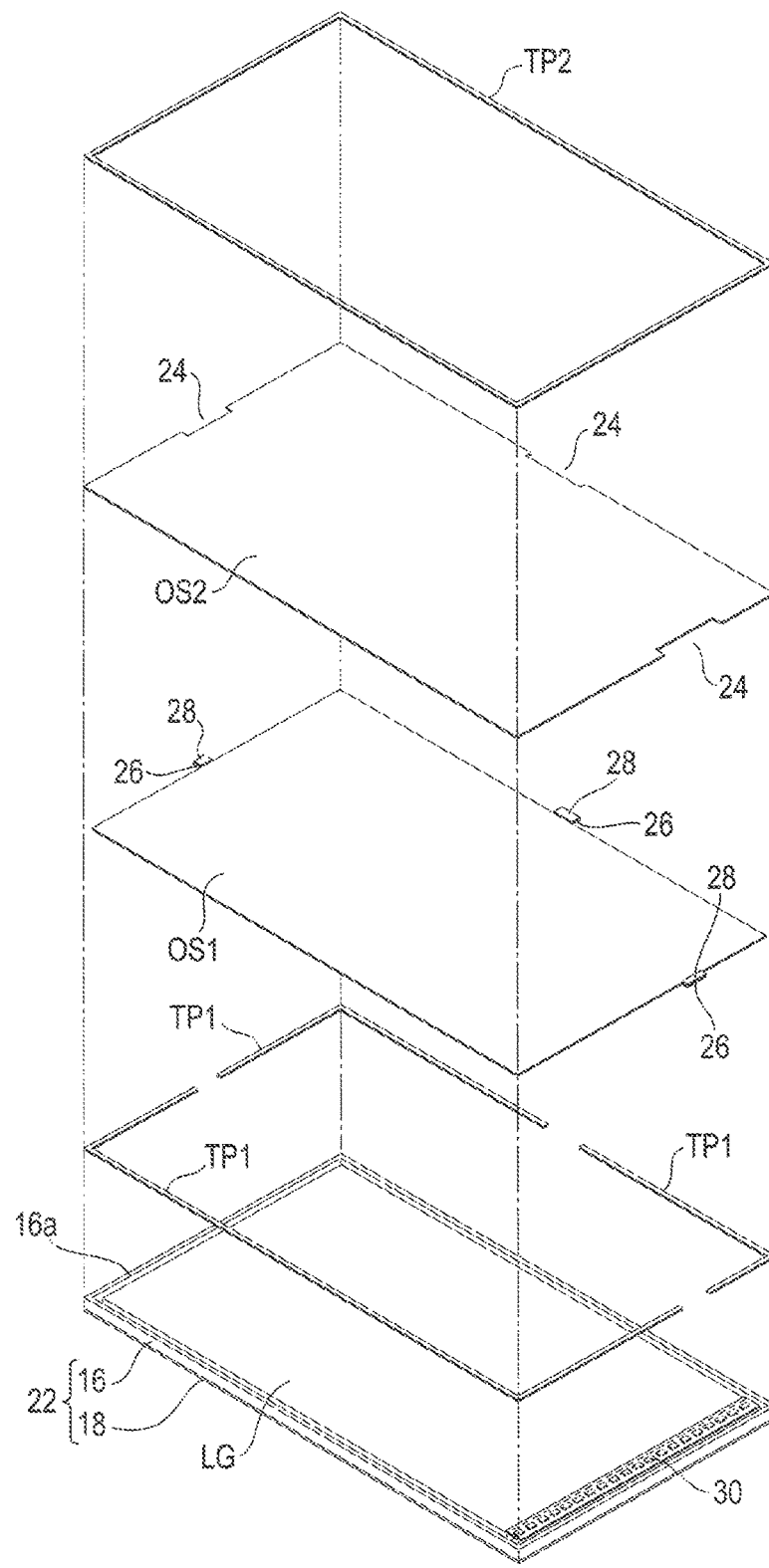
FIG. 12 is an exploded perspective view showing the backlight device according to a third modified example.

FIG. 12 is an exploded perspective view showing the backlight unit 20 of a third modified example.

According to the third modified example, the first optical sheet OS1 is formed in a rectangular shape having the outer dimensions slightly smaller than the inner dimensions of the support frame 16, as shown in FIG. 12. The first optical sheet OS1 integrally includes three tabs 26 protruding from a plurality of sides, for example, two opposed short sides and one long side. The spacer 28 having the same shape as the tab 26 is stuck on the upper surface of each of the tabs 26, i.e., the surface on the second optical sheet OS2 side. For example, a single-faced tape or a double-faced tape is employed as the spacer 28. The spacer 28 is formed to have a thickness equal to the thickness of the second optical sheet OS2 to be explained later. The first optical sheet OS1 is placed on the first surface of the light guide LG, and each of the tabs 26 is placed on the first surface 16a of the support frame 16. In the third modified example, the height position of the first surface 16a of the support frame 16 is set to be substantially the same as the height position of the light emission surface (first surface S1) of the light guide LG.

The first adhesive TP1 is provided on the first surface 16a. Furthermore, the first adhesives TP1 are provided with the gaps formed at a plurality of portions, i.e., three portions corresponding to three tabs 26 of the first optical sheet OS1. The first adhesives TP1 are arranged with gaps larger than the width of the tabs 26 at the portions corresponding to the respective tabs 26. In addition, the first adhesives TP1 have substantially the same thickness as the thickness of the first optical sheet OS1, and the upper surface of the first adhesives TP1 stuck on the first surface 16a is equal in height position to the upper surface of the first optical sheet OS1 placed on the light guide LG. In other words, the first optical sheet OS1 is surrounded by the first adhesive TP1 except the positions corresponding to the tabs 26. Three tabs 26 and three spacers 28 of the first optical sheet OS1 are located at gap portions of the first adhesives TP1 and are in contact with the first surface 16a of the support frame 16.

The second optical sheet OS2 is formed in a rectangular shape having the outer dimensions approximately equal to the outer dimensions of the support frame 16. The second optical sheet OS2 includes concaves (cutaway portions) 24 formed on a plurality of sides, for example, two opposed short sides and one long side. Each of the concaves 24 is formed to have an approximately equal width (depth) to the width of the support frame 16. The concaves 24 are provided at positions corresponding to the tabs 26.

The second optical sheet OS2 is placed on the first optical sheet OS1 and, furthermore, its peripheral portion is stuck on the first surface 16a by the first adhesive TP1. The concaves 24 of the second optical sheet OS2 are overlaid on the tabs 26 of the first optical sheet OS1. The spacer 28 on each of the tabs 26 is located in the concave 24, and its upper surface is arranged to be flush with the upper surface of the second optical sheet OS2.

The second adhesive TP2 is formed in the rectangular frame shape having the same dimensions as the support frame 16. In other words, the second adhesive TP2 is formed to have the same outer dimensions as the support frame 16 and the same width as the width of the support frame 16. The second adhesive TP2 is stuck on the peripheral portion of the second optical sheet OS2. Simultaneously, the second adhesive TP2 is stuck on the spacers 28. The tabs 26 of the first optical sheet OS1 are thereby fixed on the second adhesive TP2 via the spacers 28.

In the third modified example configured as explained above, too, the backlight unit 20 can be shaped in a narrow frame and the display device 10 can be slimmed, similarly to the first embodiment. In other words, by overlaying the support frame of the backlight unit 20, the optical sheets, and the first and second adhesives in the height direction, the backlight unit 20 can be shaped in a narrow frame as compared with a case of arranging them in the plane direction.

In addition, by forming the polarizer on the backlight unit side of the display panel (not shown) in dimensions smaller than the inside dimensions of the frame-shaped second adhesive TP2, the gap between the second optical sheet OS2 and this polarizer can be made remarkably small or the prism tip of the second optical sheet OS2 which is the prism sheet abuts on the polarizer. The entire body of the display device can be thereby slimmed.

The polarizer is designed to comprise a reflecting and polarizing layer and a transparent member stuck on the reflecting and polarizing layer, and can also employ a structure in which the tip of the prism sheet is in contact with the transparent member.

Fourth Modified Example

Figure 14:
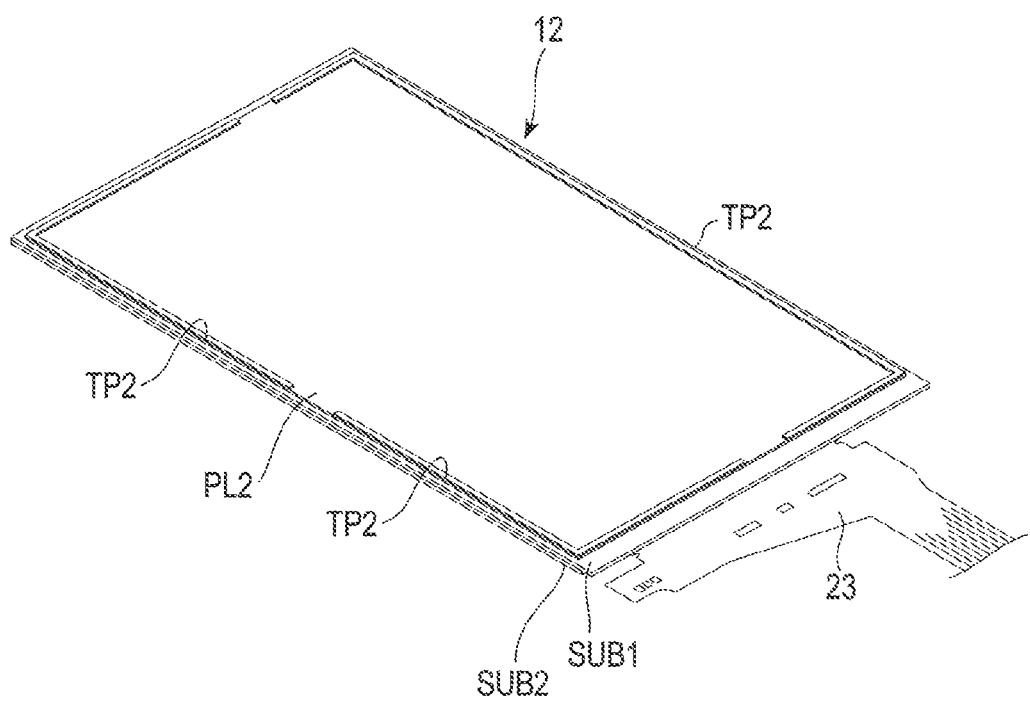
FIG. 14 is a perspective view showing the liquid crystal display panel in the liquid crystal display device according to the fourth modified example.

FIG. 13 is an exploded perspective view showing the display device of a fourth modified example and FIG. 14 is a perspective view showing the rear surface side of the display panel of the fourth modified example.

As shown in FIG. 13 and FIG. 14, the second adhesive TP2 is preliminarily stuck on the rear-surface peripheral portion of the polarizer PL2 of the display panel 12, in the fourth modified example. In this case, the polarizer P2 equipped with the second adhesive TP2 is formed by stamping the outer shapes of the polarizer sheet and the second adhesive TP2 together in a state in which the second adhesive TP2 is stuck on the polarizer sheet. The polarizer P2 is stuck on the surface of the first substrate SUB1 of the display panel 12.

In contrast, the backlight unit 20 is configured similarly to the first embodiment, except the second adhesive TP2. The backlight unit 20 is attached to the display panel 12 by sticking the peripheral portion of the first optical sheet OS1 on the second adhesive TP2 on the display panel 12 side. After the backlight unit 20 is attached to the display panel 12, the structure of the display device 10 is the same as the display device of the first embodiment.

According to the fourth modified example configured as described above, the outer shapes of the polarizer PL2 and the second adhesive TP2 can be made to be flush, i.e., displacement between the second adhesive TP2 and the polarizer PL2 can be removed and the adhesion area of the second adhesive TP2 can be secured to a maximum level. The backlight unit 20 can be firmly fixed to the display panel 12. In the third modified example, too, the same advantages as those of the first embodiment can be obtained.

Second Embodiment

Figure 15:
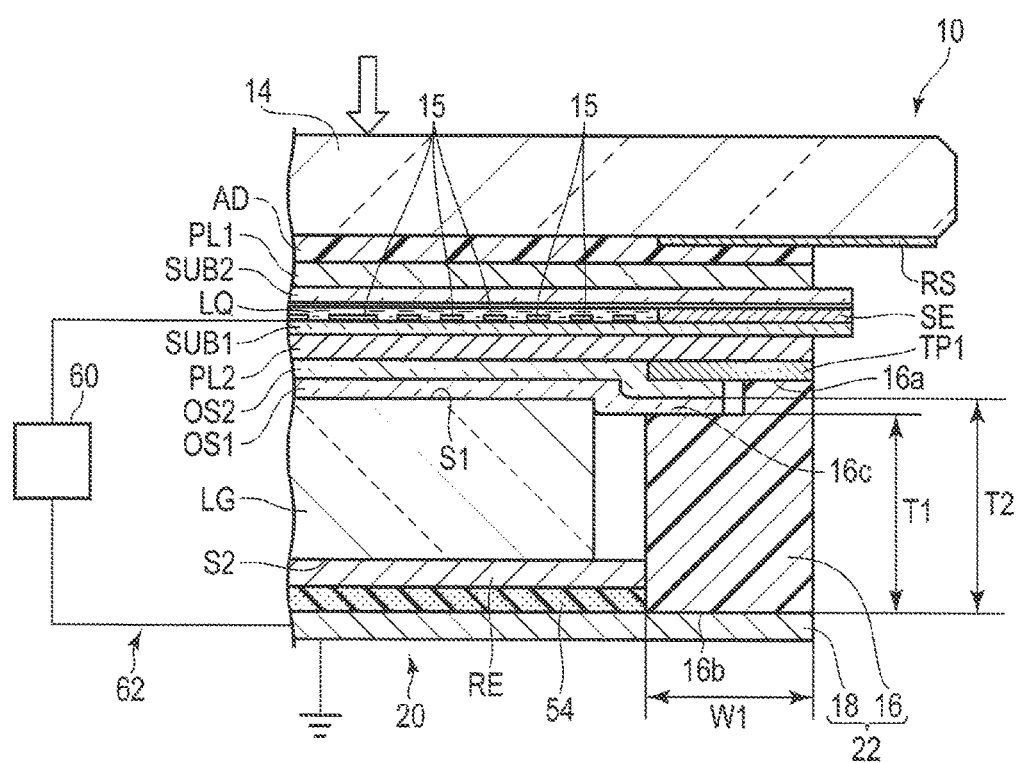
FIG. 15 is a cross-sectional view showing a liquid crystal display device according to a second embodiment.

FIG. 15 is a laterally cross-sectional view showing a display panel according to a second embodiment.

As shown in FIG. 15, a rectangular cushion sheet (cushion member) 54 is laid on a bottom plate 18 of a case 22, in the present embodiment. The cushion sheet 54 is formed of, for example, an elastic material such as urethane foam or sponge. A reflective sheet RE and a light guide LG are overlaid and placed in order on the cushion sheet 54. The cushion sheet 54 is provided in a state of storing elastic resilience. In other words, the cushion sheet 54 has an elastic return force, presses the reflective sheet RE in a first direction of separating from the bottom plate 18, and is accommodated between the reflective sheet RE and the bottom plate 18 in a state of being shrunk such that the cushion sheet 54 is shrinkable by pressing from a second direction opposite to the first direction.

A support frame 16 includes a lower step portion 16c formed on an inner peripheral side of a first surface 16a. A height T1 of the step portion 16c is formed to be lower than a height T2 of a first surface S1 of the light guide LG. In addition, the height (depth) of the step portion 16c is formed to be equal to thickness of two sheets, i.e., a first optical sheet OS1 and a second optical sheet OS2 to be explained later.

The first optical sheet OS1 is placed on the first surface S1 of the light guide LG. In addition, a peripheral portion of the first optical sheet OS1 is placed on the step portion 16c. The second optical sheet OS2 is placed on the first optical sheet OS1 and a peripheral portion of the second optical sheet OS2 is overlaid on the first optical sheet OS1 and placed on the step portion 16c. An upper surface of the peripheral portion of the second optical sheet OS2 is arranged with the first surface 16a of the support frame 16 in the same plane, i.e., arranged to be flush with the first surface 16a by overlaying the peripheral portion of the first optical sheet OS1 and the peripheral portion of the second optical sheet OS2 on the step portion 16c.

A backlight unit 20 comprises a first adhesive (for example, a double-faced tape) TP1 formed in a rectangular frame shape. The first adhesive TP1 is formed to have the same width as a width W1 of the support frame 16. The first adhesive TP1 is stuck on the first surface 16a and the peripheral portion of the second optical sheet OS2 to fix the peripheral portions of the first optical sheet OS1 and the second optical sheet OS2 on the support plate 16. Thus, the first optical sheet OS1, the second optical sheet OS2 and the first adhesive TP1 are overlaid in the height direction (thickness direction) of the backlight unit 20.

The backlight unit 20 configured as explained above is disposed oppositely to the rear surface of the display panel 12 and attached to the polarizer PL2 of the display panel 12 by the first adhesive TP1. In other words, the support frame 16 is stuck on the rear peripheral portion of the polarizer PL2 by the first adhesive TP1, and the outer periphery of the support frame 16 and the outer periphery of the first adhesive TP2 are arranged in a state of being aligned with the periphery of the polarizer PL2. In addition, the reflective sheet RE and the light guide LG are pressed upwardly by the cushion sheet 54 and, furthermore, the light guide LG presses the first optical sheet OS1 and the second optical sheet OS2 upwardly to urge the upper surface of the second optical sheet OS2 to abut on the polarizer PL2. Thus, a portion substantially opposed to the display surface except the peripheral portion, of the upper surface of the second optical sheet OS2, is located in the same plane as the upper surface of the first adhesive TP1, i.e., arranged to be flush with the upper surface of the first adhesive TP1 and abuts on the polarizer PL2 without a gap.

In the present embodiment, the display device 10 comprises a press detection function of detecting a pressed state of the cover panel 14. For example, the display device 10 comprises a press sensor 62, which comprises a panel-side electrode portion 15 composed of common electrodes, detection electrodes or pixel electrodes of the display panel 12, a metallic bottom plate 18 of the case 22 and a controller 60 electrically connected to these portions. The bottom plate 18 is formed of, for example, a stainless plate having a thickness of 0.3 mm and connected to a ground potential to function as a casing-side electrode portion. The controller 60 of the press sensor 62 transmits a sensor drive signal to either the panel-side electrode portions 15 or the bottom plate 18, for example, the panel-side electrode portions 15. If a pressing force caused by touch on the cover panel 14 or the like is input in this state, the cushion sheet 54 is pressed through the display panel 12, the light guide LG and the like and warp. The display panel 12 is thereby slightly warped toward the bottom plate 18 side about the pressed portion and a distance between each of the panel-side electrode portions 15 and the bottom plate 18 is varied in accordance with the warp. In accordance with the variation in distance, capacity between the panel-side electrode portions 15 and the bottom plate 18 is varied, and the controller 60 receives signals including the capacitive variation from either the panel-side electrode portions 15 and the bottom plate 18, for example, the panel-side electrode portions 15. The controller 60 detects the pressed state of the cover panel 14, based on the receive signals.

The metallic bottom plate 18 is adopted as the casing-side electrode portion in the above embodiment but a structure in which another metallic or film-shaped electrode is provided on the bottom plate and stacked on the bottom plate can also be adopted. In addition, a structure in which the electrodes provided between the pair of substrates are employed as panel-side electrode portions or a structure in which an electrode layer is alternately provided between the cover panel 14 and the pair of substrates, can also be adopted as the structure of the panel-side electrode portions 15. If this structure is adopted, a structure in which electrodes are arrayed in a matrix as the panel-side electrode portions, sensor drive signals are output to the respective electrodes of the casing-side electrode portion and receive signals are received from the panel-side electrode portions, can also be adopted. In addition, a structure in which the detection of the pressed state is processed by the controller 60 or a structure in which a certain amount of the above-explained receive signals is preliminarily stored in the controller 60 and then operated by another processor connected to the display panel can also be adopted.

According to the second embodiment configured as described above, the first adhesive TP1 of the backlight unit 20 is stacked on the step portion 16c of the support frame 16 in the height direction together with the first optical sheet OS1 and the second optical sheet OS2 and the optical sheets are bonded with the first adhesive TP1. The thickness of the first adhesive TP1 can be thereby included in the thickness of the light guide LG and the optical sheets OS1 and OS2, and the backlight unit 20 and the display device 10 can be slimmed. Simultaneously, the gap between the second optical sheet OS2 of the backlight unit 20 and the display panel 12 can be removed and the entire body of the device can be further slimmed.

Furthermore, the input pressure (touch pressure) can be accurately detected by removing the gap between the second optical sheet OS2 and the display panel 12, in the present embodiment. In other words, if a gap exists between the second optical sheet OS2 and the display panel 12, at least part of the input touch pressure may be absorbed into the gap and the touch pressure can hardly be accurately transferred to the light guide and the cushion sheet. For this reason, accurately matching the touch pressure and the variation amount on the display panel is difficult. In contrast, in the present embodiment, Furthermore, the touch pressure can be accurately transferred to the cushion sheet 54 via the display panel, the optical sheets, and the light guide by removing the gap and, consequently, movement amount of the electrodes on the display panel and the touch pressure can be accurately matched. The touch pressure can be thereby detected accurately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes which can be implemented by a person of ordinary skill in the art through arbitrary design changes to the structures described above as embodiments of the present invention come within the scope of the present invention as long as they are in keeping with the spirit of the present invention. In addition, other effects which can be obtained by the above embodiments or modified examples and are self-evident from the description in this specification or can be arbitrarily conceived by a person of ordinary skill in the art are considered to be achievable by the present invention as a matter of course.

The outer shape and the inner shape of the display panel and the constituent members of the backlight unit are not limited to the rectangular shape, but either or both of the outer shape and the inner shape may be the other shape such as a polygon in planar view, a circle, an ellipsoid and a combination of these shapes. The materials of the constituent members are not limited to the above-explained examples but can be variously selected.

What is claimed is:

1. A backlight device comprising:
   a case;
   a light guide in the case;
   a first optical sheet on the light guide;
   a second optical sheet on the first optical sheet;
   a first adhesive provided between the case and at least one of the first optical sheet and the second optical sheet, to adhere at least one of the first and second optical sheets to the case; and
   a light source in the case, configured to emit light to the light guide, wherein
   the first optical sheet includes a concave overlaid on the first adhesive,
   the second optical sheet includes a tab projecting from a side edge of the second optical sheet,
   the tab is stacked on the first adhesive through the concave,
   the case comprises a support frame including a first surface and a second surface on a side opposite to the first surface, and a bottom plate covering the second surface side of the support frame,
   the light guide is placed on the bottom plate,
   the first adhesive is adhered to the first surface of the support frame,
   the first optical sheet includes a peripheral portion overlaid on the first surface and directly adhered to the first adhesive and a second adhesive,
   the first surface of the support frame is provided at a position lower than a light emission surface of the light guide in the case, and
   the first adhesive is adhered to the first surface, and comprises a surface adhered to the first optical sheet and located in the same plane with the light emission surface of the light guide.

2. The backlight device of claim 1, further comprising:
   a spacer provided between the tab and the first adhesive.

3. The backlight device of claim 1, wherein: the second optical sheet is disposed on the first optical sheet in a state in which a periphery of the second optical sheet is surrounded by the second adhesive, and the second adhesive and the second optical sheet are located in a same plane.

4. A display device, comprising:
   a display panel comprising a pair of substrates opposed to each other, a liquid crystal layer sealed between the pair of substrates, and a polarizer on an outer surface of each of the substrates;
   a backlight device comprising a case, a light guide in the case, a first optical sheet on the light guide, a second optical sheet on the first optical sheet, and a light source in the case, configured to radiate light into the light guide;
   a panel-side adhesive provided between the case and the display panel; and
   a casing-side adhesive provided between the case and the first optical sheet, wherein
   the panel-side adhesive and the second optical sheet are arranged in a same plane and abutting on the polarizer of the display panel,
   the first optical sheet includes a concave overlaid on the casing-side adhesive,
   the second optical sheet includes a tab projecting from a side edge of the second optical sheet,
   the tab is stacked on the casing-side adhesive through the concave,
   the case comprises a support frame including a first surface and a second surface on a side opposite to the first surface, and a bottom plate covering the second surface side of the support frame,
   the light guide is placed on the bottom plate,
   the casing-side adhesive is adhered to the first surface of the support frame,
   the first optical sheet includes a peripheral portion overlaid on the first surface and directly adhered to the panel-side adhesive,
   the first surface of the support frame is provided at a position lower than a light emission surface of the light guide, and
   the casing-side adhesive is adhered to the first surface and comprises a surface adhered to the first optical sheet and located in a same plane as the light emission surface of the light guide.

5. The display device of claim 4, wherein
   the panel-side adhesive is provided between the first optical sheet and the polarizer.

* * * * *